United States Patent
Slaven et al.

[11] Patent Number: 6,038,441
[45] Date of Patent: Mar. 14, 2000

[54] METHOD AND SYSTEM FOR CREATING RECORDS OF VOICE MESSAGES IN AN AUTOMOTIVE VEHICLE

[75] Inventors: John P. Slaven, Harper Woods; Wilfredo U. Barcelon, Waterford; David Fu, Rochester Hills, all of Mich.

[73] Assignee: Lear Corporation, Southfield, Mich.

[21] Appl. No.: 08/910,458

[22] Filed: Aug. 5, 1997

[51] Int. Cl.[7] ............................................. H04Q 7/32
[52] U.S. Cl. ................................. 455/413; 455/550
[58] Field of Search ................................ 455/412, 413, 455/550, 575, 90; 379/70, 79, 82

[56] References Cited

U.S. PATENT DOCUMENTS

| | | | |
|---|---|---|---|
| 5,058,150 | 10/1991 | Kang | 455/412 |
| 5,444,761 | 8/1995 | Nagashima | 455/412 |
| 5,636,265 | 6/1997 | O'Connell et al. | 455/412 |
| 5,740,543 | 4/1998 | Maeda | 455/575 |
| 5,790,957 | 8/1998 | Heidari | 455/412 |
| 5,821,874 | 10/1998 | Parvulescu et al. | 455/413 |
| 5,826,187 | 10/1998 | Core et al. | 455/412 |

*Primary Examiner*—Edward F. Urban
*Attorney, Agent, or Firm*—Brooks & Kushman P.C.

[57] ABSTRACT

A method and system are provided for creating and storing records of voice messages in an automotive vehicle in one or more digital memory devices for subsequent playback over the vehicle's speaker. A microcontroller provides control signals to the memory devices which may take the form of a digital answering machine or a digital memo pad to thereby retrieve a desired voice message stored therein. Speaker multiplexer and amplifier circuitry, also under control of the microcontroller, receives the retrieved voice message and converts it into an input electrical signal for the speaker. An input device in the form of a key pad provides user input signals to the microcontroller so that the microcontroller may divert incoming cellular calls to the digital answering machine. The system under control of the microcontroller may store voice messages of the vehicle's user in either the digital answering machine or to the digital memo pad. A voice synthesizer, also under control of the microcontroller, is capable of providing a voice message also conveyed by the speaker multiplexer and amplifier circuitry to the car speaker.

6 Claims, 1 Drawing Sheet

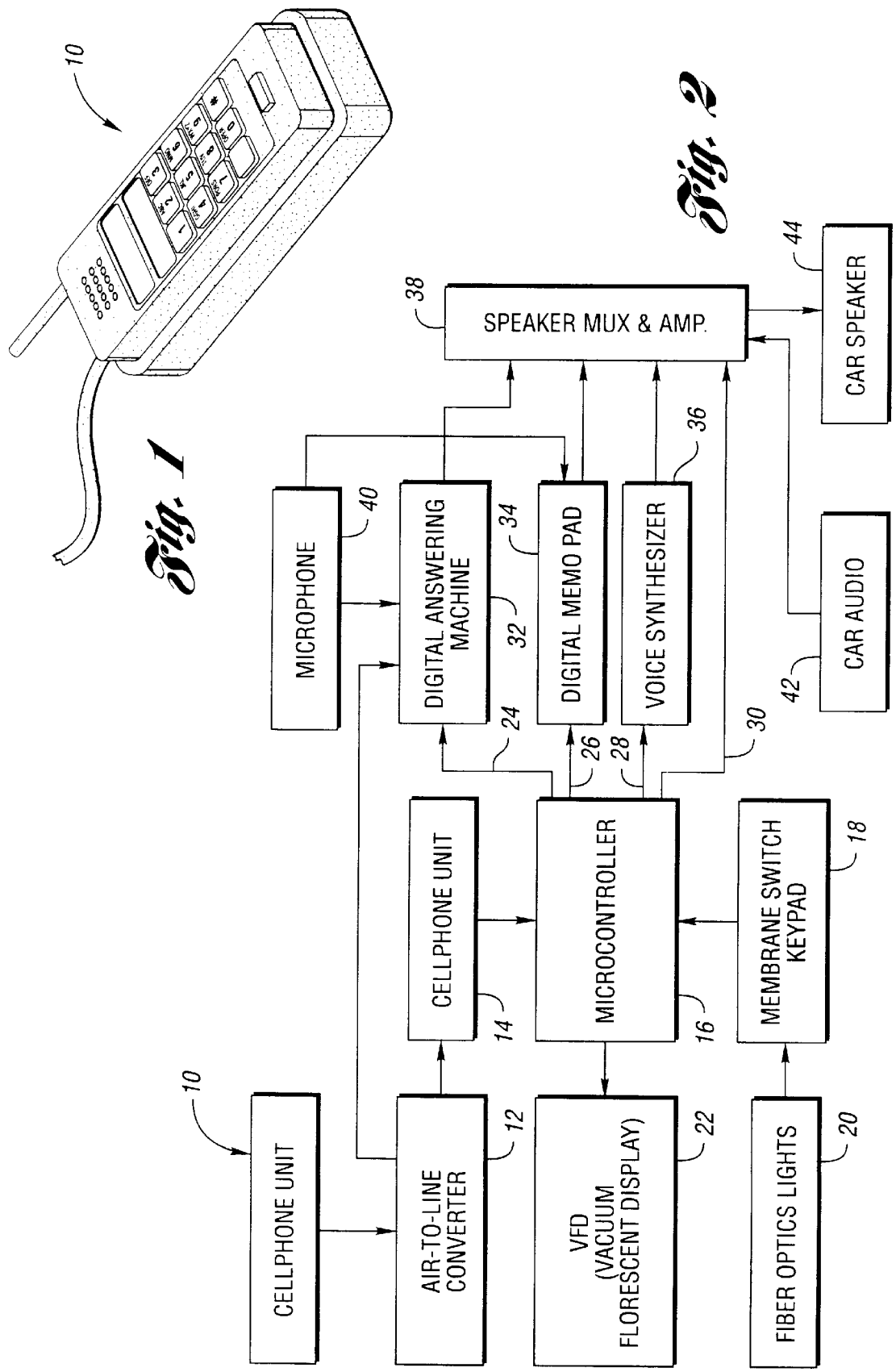

METHOD AND SYSTEM FOR CREATING RECORDS OF VOICE MESSAGES IN AN AUTOMOTIVE VEHICLE

TECHNICAL FIELD

This invention relates to methods and systems for creating records of voice messages and, in particular, to methods and systems for creating records of voice messages in an automotive vehicle.

BACKGROUND ART

A driver of a vehicle oftentimes cannot answer his/her cell phone when it is ringing for a number of reasons. However, it is desirable to create a record of such a phone call.

It is also desirable that the driver of the vehicle also be able to create records which can be later played back so that the driver need not use a pencil and paper to prepare a written record of his or her thoughts.

SUMMARY OF THE INVENTION

An object of the present invention is to provide a method and system for creating records of voice messages in an automotive vehicle which messages can be stored in one or more memory devices for later playback.

In carrying out the above object and other objects of the present invention, a method is provided for creating records of voice messages in an automotive vehicle. The method includes the steps of receiving a plurality of signals and converting the signals to corresponding voice messages. The method also includes the steps of storing the voice messages in a first memory device to obtain a record and selectively retrieving a desired one of the voice messages from the memory device. The method finally includes the step of converting the voice message retrieved from the first memory device into a corresponding electrical input signal for the speaker.

Further in carrying out the above object and other objects of the present invention, a system is provided for creating records of voice messages in an automotive vehicle. The system includes a first converter for converting signals into a first plurality of corresponding voice messages and a first memory device for storing the first plurality of voice messages to obtain a first record. The system also includes an input device and a controller coupled to the input device and the first memory device for selectively retrieving a desired one of the first plurality of stored voice messages from the first memory device. Finally, the system includes a second converter for converting the voice message retrieved from the first memory device into a first electrical input signal for the speaker.

Preferably, the system further includes a third converter for converting audio signals into a second plurality of voice messages and a second memory device for storing the second plurality of voice messages to obtain a second record. The controller is also coupled to the second memory device and the second converter for selectively retrieving a desired one of the second plurality of messages from the second memory device and wherein the second converter converts the voice message retrieved from the second memory device into a second electrical input signal for the speaker.

Preferably, the input device is a keypad and the controller is a microcontroller.

Also, preferably, the signals include incoming cellular calls and wherein the first memory device is an answering machine.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic view partially broken away of a cellular phone adapted for use in an automotive vehicle; and FIG. 2 is a schematic block diagram illustrating the method and system of the present invention.

BEST MODE FOR CARRYING OUT THE INVENTION

Referring now to the drawing Figures, there is illustrated in FIG. 1 a cellular phone or cellphone unit, generally indicated at 10, and which is adapted for use in an automotive vehicle.

Referring now to FIG. 2, the cellphone unit 10 is typically connected to an air-to-land line converter at block 12.

The system also includes a ring detector 14 which detects when an incoming cellular call has come in. The ring detector 14 is connected to a microcontroller 16 which receives an input signal from the ring detector 14 indicating a ring. The microcontroller 16 also receives input signals from a membrane switch keypad 18 with fiber optic lights 20 embedded between display panels thereof. The keypad 18 is preferably of the membrane switch type with the fiber optic lights 20 embedded between its display panels.

The microcontroller 16 is also connected to an VFD (vacuum fluorescent display) 22 to provide a visual display to an operator of the vehicle of the operating status of the system.

Based on the input signals from the ring detector 14 and the membrane switch keypad 18, the microcontroller provides control signals along lines 24, 26, 28 and 30 to a digital answering machine 32, a digital memo pad 34, a voice synthesizer 36, and speaker multiplexer and amplifier circuitry 38, respectively.

The digital answering machine 32 is connected to the air-to-land line converter 12 as well as a microphone 40 which, in turn, is also connected to the digital memo pad 34. The digital answering machine 32 stores voice messages therein which may originate from either the unit 10 or the microphone 40.

The speaker multiplexer and amplifier circuitry 38 is also connected to the vehicle's audio circuitry 42 which provides audio input signals to the speaker multiplexer and amplifier circuitry 38 which, in turn, provides the necessary electrical input signals to a car speaker 44 of the vehicle.

The microphone 40 allows a user or operator of the vehicle to record or store voice messages in either the digital answering machine 32 and/or the digital memo pad 34 as determined by the microcontroller 16 via the keypad 18.

Typically, when an incoming cellular call comes into the vehicle via the cellphone unit 10, the car audio 42 will be muted under control of the microcontroller 16 and a voice annunciation such as "You have an incoming call" will be generated under control of the microcontroller 16 by the voice synthesizer 36 which provides signals to the speaker multiplexer and amplifier circuitry 38 to provide the audio message at the car speaker 44.

If the occupant doesn't want to receive the telephone call, the digital answering machine 32 picks up the call and takes and stores the voice message under control of the microcontroller 16.

A display center (not shown) has soft key control of all of the functions performed by the system.

By going through a menu of the display center, the user of the system can record any number of memos up to a maximum of three minutes of recording time into the digital memo pad 34 under control of the microcontroller 16.

When the system is in its answering machine mode, the microcontroller 16 is capable of controlling the answering machine 32 to allow "playback", "repeat", "skip", and "save incoming messages". The output of the answering machine 32 is typically "on" in this mode and a retrieved message is received by the speaker multiplexer and amplifier circuitry 38 also under control of the microcontroller 16.

When the system is in its memo pad mode, the digital memo pad 34, also under control of the microcontroller 16, is capable of "playback", "record", "delete", "replay", "go to the previous message", and "go to the very first memo" and "go to the very last memo". Also, in this mode, the digital memo pad output is also "on" and is connected to the speaker multiplexer and amplifier circuitry 38 to receive a retrieved message therefrom also under control of the microcontroller 16.

While the best mode for carrying out the invention has been described in detail, those familiar with the art to which this invention relates will recognize various alternative designs and embodiments for practicing the invention as defined by the following claims.

What is claimed is:

1. A system for creating records of voice messages in an automotive vehicle including a speaker, the system comprising:

a first converter for converting signals including incoming cellular calls into a first plurality of corresponding voice messages;

a ring detector;

an answering machine for storing the first plurality of voice messages to obtain a first record;

an air-to-land line converter connected to the first converter and the ring detector to allow the ring detector to detect when a cellular call has come in;

an input device;

a controller coupled to the ring detector, the controller receiving an input signal from the ring detector indicating a ring, the controller also coupled to the input device and the answering machine for providing a control signal to the answering machine based on the input signal from the ring detector to store the first plurality of voice messages, the controller also selectively retrieving a desired one to the first plurality of stored voice messages from the answering machine; and a second converter for converting the voice message retrieved from the answering machine into a first electrical input signal for the speaker.

2. The system as claimed in claim 1 wherein the input device is a keypad.

3. The system as claimed in claim 1 wherein the controller is a microcontroller.

4. The system as claimed in claim 1 further comprising third converter for converting audio signals into a second plurality of corresponding voice messages and a second memory device for storing the second plurality of voice messages to obtain a second record wherein the controller is also coupled to the second memory device and the second converter for selectively retrieving a desired one of the second plurality of messages from the second memory device and wherein the second converter converts the voice message retrieved from the second memory device into a second electrical input signal for the speaker.

5. The system as claimed in claim 4 wherein the third converter includes a microphone.

6. The system as claimed in claim 1 further comprising a voice synthesizer coupled to the controller and the second converter.

* * * * *